Figure 1:
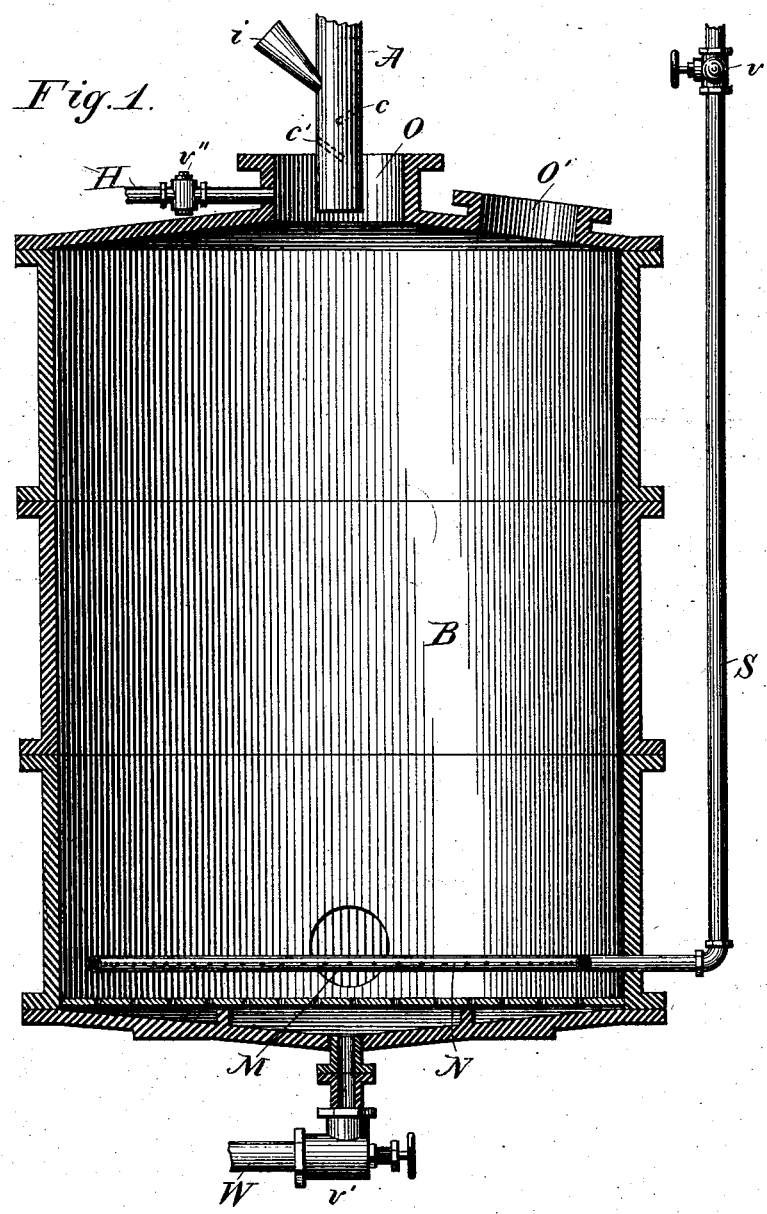

(No Model.) 2 Sheets—Sheet 1.

S. M. LILLIE.
PROCESS OF TREATING NEW BONE BLACK AND OF REVIVIFYING OLD BONE BLACK.

No. 260,486. Patented July 4, 1882.

Witnesses. Inventor.
Alice Bodine. S. Morris Lillie.
Francis Wetton.

(No Model.) 2 Sheets—Sheet 2.

S. M. LILLIE.
PROCESS OF TREATING NEW BONE BLACK AND OF REVIVIFYING OLD BONE BLACK.

No. 260,486. Patented July 4, 1882.

Witnesses.
Alice Bodine
Francis Wetton

Inventor.
S. Morris Lillie

UNITED STATES PATENT OFFICE.

S. MORRIS LILLIE, OF PHILADELPHIA, PENNSYLVANIA.

PROCESS OF TREATING NEW BONE-BLACK AND OF REVIVIFYING OLD BONE-BLACK.

SPECIFICATION forming part of Letters Patent No. 260,486, dated July 4, 1882.

Application filed November 10, 1881. (No model.)

*To all whom it may concern:*

Be it known that I, S. MORRIS LILLIE, of Philadelphia, in the county of Philadelphia and State of Pennsylvania, have discovered a new and useful Process of Treating New Bone-Black and of Revivifying Old Bone-Black, of which (the said process) the following is a specification.

It is the common experience of sugar-refiners that the efficiency of new and unused bone-black as a decolorizer and purifier of sugar solutions is not so great as that of the same black after it has been used for a time and has been subjected to several revivifications, and that the liquors which have been passed through the black and the refined sugars obtained from the said liquors are not so good in character in the former case as in the latter. It is also the common experience of sugar-refiners that bone-black, after continued use, gradually becomes spent and loses to a great degree its decolorizing-power, which power the usual methods of revivification are unable to restore to it.

The object of my process in the treatment of new bone-black is to endow it with a greater potency than is possessed by it in its untreated condition, so that the results obtained from it when used as a decolorizer and purifier of sugar solutions may be satisfactory from the first.

The object of my process in the treatment of spent or partially-spent bone-black is to restore its lost potency to it to a great degree—an effect the usual methods of revivification are inadequate to accomplish.

My process consists in subjecting the black, new or old, to the action of caustic lime, conveniently as a milk of lime, for a more or less long time, and then in washing the black with suitable solvents to remove from the same the free alkalies and the carbonate of lime resulting from the reaction between the caustic lime and the alkaline carbonates contained in the black, and also to remove any excess of lime that there may be. New and unused black thus treated will be found to have lost nearly all of the ammoniacal and alkaline salts originally contained in it, and to have acquired an increased power of decolorizing sugar solutions, as a result of which its action upon sugar-liquors will be found to be in all respects more satisfactory than that of the same black before treatment. The more or less completely spent black thus treated will be found to have had its decolorizing-power very much enhanced, and it will be found to have lost the grayish, stony appearance often seen in long-used black, if present, and to have acquired the darker hue of comparatively-fresh char. Its revivified condition will also be indicated by its more energetic adherence to the tongue. The greater portion of any ammonia, or of its salts, or of any sulphureted hydrogen or sulphides, will also be found to be eliminated from the black, or to have been rendered less harmful.

The treatment of the black according to my process may be performed in a variety of ways and in a variety of apparatus. The *modus operandi,* for example, may be varied as regards the manner of effecting the mixture of the lime with the black, the proportion of the lime used, and the condition of the latter. It may be used as lime-water, a more or less dense milk of lime, or even as a dry powder; as regards the condition of the black when the lime is added—as wet or dry—and the time when it is added, as, in the case of old black, immediately after a filtration of liquor through the same and before revivification in the kilns, or after it has been revivified; again, it may be varied as regards the solvent used for removing from the treated black the matters resulting from the treatment that are insoluble or but sparingly soluble in water; it may be sulphurous acid, hydrochloric acid, or other acid.

In the accompanying drawings I have shown apparatus adapted to be used in treating new or old black according to my process, which is similar to that used by myself in treating black on the large scale in quantities as great as sixty thousand pounds at a time. It consists of a large vertical cylinder, B, (see Fig. 1,) closed above and below, having internal dimensions of, say, ten feet in diameter and fourteen (14) feet high. At the bottom it has an eduction-pipe, W, which may be opened or closed by the valve V', a false perforated bottom, D, for the contents of the cylinder to rest upon, a man-hole, M, (shown closed,) through which the treated black may be withdrawn from the cylinder, and a perforated worm-pipe or series of pipes, N, communicating through the side wall of the cylinder with a steam main, S, provided with a valve, V, by which the flow of the steam through the pipe N into the cylinder may be regulated or checked at will.

The top or cover of the cylinder has two openings, O O', through it, which may be tightly closed by caps and bolts in the usual manner.

H is a water-pipe, which opens into the interior of the cylinder B through the walls of the opening O.

The above elements constitute the apparatus in which the black is treated.

The chute A (shown extending into the opening O in the top of the cylinder) and the tube or funnel $i$, opening into the chute, together furnish means of introducing the black into the cylinder B, and also of thoroughly mixing with the black a milk of lime or any other liquid to whose action it may be desired to subject the black.

Below the point of juncture of the tube $i$ with chute A the interior of the latter contains a series of inclined shelves, $c\ c'$, located alternately on opposite sides of the passage, by which anything flowing through the chute is compelled to take a circuitous course. The chute A communicates above with a hopper or bin, (not shown in the drawings,) from which, however, it may be disconnected and removed from the opening O at will.

The use of the above-described apparatus in carrying on my process of treating bone-black is as follows, viz: The bone-black to be treated is run into the hopper with which the chute A communicates, and is allowed to flow at as nearly a uniform rate as may be through the chute A into the cylinder B, while at the same time a constant stream of milk of lime, of such volume and density as are necessary to supply the desired quantity of lime to the black, is introduced into the chute A through the tube or funnel $i$. On entering the chute the milk of lime meets the bone-black flowing through the same, and together they pass over and around the series of shelves $c\ c'$ and fall from the chute into the cylinder more or less thoroughly mixed together. I practice having the density of the milk of lime such that the quantity of it necessary to supply the requisite amount of lime to the black will be sufficient to thoroughly wet the black. I have generally used an amount of lime equal to about three per cent. (3 %) of the weight of the black, both for new and old black. The flow of the black and of the milk of lime through the chute A is continued until the cylinder is filled, and this having been completed and the surface of the black leveled, the treatment of the black is proceeded with in one of various manners, which are severally as follows, viz:

First, the cylinder B having been filled with the limed black, as above, steam is allowed to flow under full pressure into the cylinder through the perforated worm N, which, for this method of working, should consist of a series of coils forming a flat spiral covering the bottom of the cylinder, so that the steam in ascending would pass through all parts of the mass of the black, and the valve V' in the eduction-pipe W is opened sufficiently to allow the water and condensed steam to drain away from the black, but not enough to permit the escape of any steam. The steam is allowed to flow into the cylinder and to pass rapidly upward through the mass of the black and out of the openings in the top of the cylinder for a variable length of time, the effect being to thoroughly heat the limed black, and so promote the chemical reactions incident to the process, and also, in the case of new black, to carry off with it quantities of free ammonia liberated by the action of the lime on the ammonia salts originally contained in the black. At the same time the drainings from the black, flowing through the eduction-pipe W, are bearing away with them the other free alkalies liberated by the reaction of the lime with their salts, also contained in the black. The steaming of the black having been continued as long as it may be thought best, the valve in the eduction-pipe W is closed, and hot water is run into the cylinder through the main H at the top of the cylinder until the same is filled to a level above the top of the black. The valve in the eduction-pipe W is then opened and the water allowed to flow from the bottom of the cylinder as rapidly as it enters it at the top, so that the level of the water is always maintained above that of the black. This washing with hot water is continued until the washings flowing from W show but a trace of alkalinity, indicating that the freed alkalies and the excess of lime (not fixed and remaining in the black as insoluble salts of lime, principally carbonate, formed by the reaction between the lime and the alkaline salts originally in the black) are removed from the black. This point having been reached, this stage of the process is completed, and the water may be drawn off and the black removed from the cylinder through the man-hole M, may be dried, and used for the decolorization and purification of sugar solutions with excellent results. Better results are obtained, however, if the black is subjected to a further treatment, by which a portion of the carbonate of lime contained in the black, or at least of that added to the black by the treatment of the same with lime, as above, is removed from it. This I accomplish by washing the black while still in the cylinder with a solvent for the carbonate of lime—as, for example, with carbonic-acid water, sulphurous-acid water, a dilute solution of hydrochloric acid, &c.—and finally by washing the black with water to remove the soluble salts of lime formed.

In the case of the carbonic-acid and sulphurous-acid waters, the black should be cooled by washing it with cold water previous to their use, and the water with which the black is subsequently washed should also be cold, as both the soluble bicarbonate and the soluble bisulphite of lime, formed respectively in the two cases, would be destroyed by a high temperature, and the insoluble carbonate and sulphite of lime would be formed and precipitated into the pores of the black. Indeed, should it be desirable, for any reason, to introduce a percentage of sulphite of lime into bone-black, this method might be pursued for the purpose— i. e., by washing or saturating the black with sulphurous-acid water, and then heating the black to destroy the bisulphite of lime formed, and to precipitate the sulphite into the pores of the black.

An objection to the above method of treating the black with an acid solution for the removal of a portion of its carbonate of lime is that the upper portions of the black, through which the acid solution must pass before it can reach and act upon the black below, receive a more thorough treatment than the black underneath, and at the end of the treatment the black in the cylinder will contain varying proportions of carbonate of lime, increasing in amount in proportion as the black is further below the surface; and when a strong acid— such as muriatic—is used much of the phosphate of lime of the upper layers of the black might be dissolved and the black "rotted."

A better way of operating in the treatment of the black with the acid, and one which will permit of the stronger acids being used without injury to the body of the black, which is the phosphate of lime in the black, is as follows: The washing subsequent to the liming of the black having been completed, the moist black is withdrawn from the cylinder and sufficiently dried by passing it through revivifying-kilns or otherwise, so that it will readily flow through the chute A. It is then again poured into the hopper above the chute A, and is allowed to run at a uniform rate through the latter into the cylinder, while a weak solution of the acid to be used is simultaneously run into the tube or funnel i, which, meeting with the black in the chute A, passes with it over the shelves c c', and the two fall, thoroughly mixed together, into the cylinder B below. The volumes of the black and acid solution should be so proportioned to each other that the black will issue from the bottom of the chute thoroughly moistened, and the density of the acid solution should be such that sufficient acid will be introduced into the black to remove the amount of carbonate of lime or other substances desired. The black, having been charged with the acid solution, as above, is washed thoroughly with pure water to remove the soluble salts of lime formed from the same.

Figure 2:
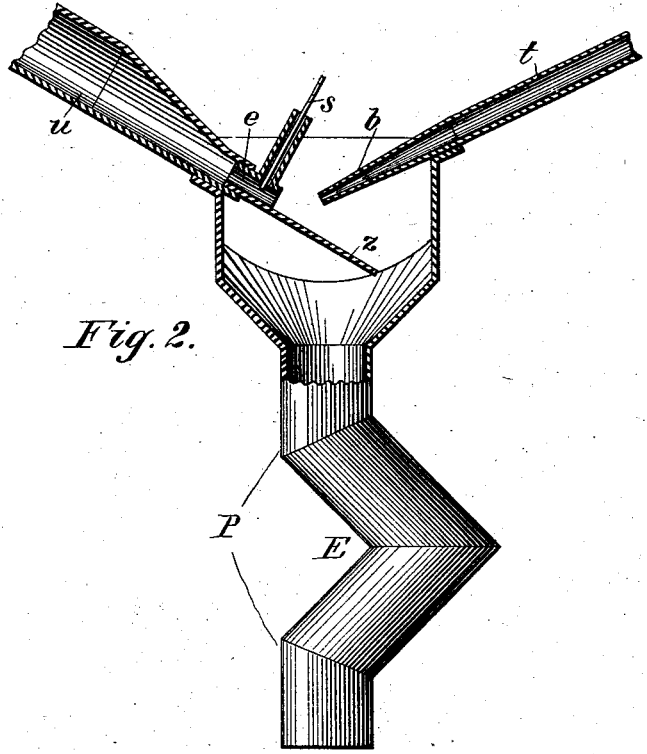

In Fig. 2 of the drawings is illustrated another apparatus for mixing the black either with the milk of lime or with the acid solution. Its operation is similar to that of the device shown in Fig. 1, and hereinbefore described. The bone-black flows from the pipe u through the narrow but comparatively-long opening e, whose width may be varied by means of the slide s in a thin layer over the apron z into the pipe P, having the bends or elbows E in it. The milk of lime or the acid solution, as the case may be, flows from the tube t through the narrow elongated slit b in a thin sheet upon the thin layer of black moving over the apron z, and together they fall into the pipe P, and, flowing around the bends or elbows E, emerge, thoroughly mixed together, from the bottom of the pipe. The black and liquid would fall from the apron z quite well mixed, and the pipe P might be dispensed with without any serious detriment; but the use of it insures a more thorough mixing of the two.

For the mixing apparatus, which in Fig. 1 consists of the shelves c c' in the chute A and in Fig. 2 of the bent pipe E, there might be substituted a suitable mechanical mixer; but such as those shown are more simple and quite effective.

A second method of treating the limed black with which the cylinder B has been filled is: Turn the steam into the cylinder, Fig. 1, through the pipe S and worm N, and also run hot water into the same through the pipe H until the cylinder is filled with water. This having been done, close the openings O O' in the top of the cylinder with their respective plates, shut off the water from H, and, with the steam still on, allow the black to stand under pressure for a few hours. Then open the valve in the waste-water pipe W, open the cock V'' in the pipe H, and wash with hot water until the washings show but a trace of ammonia or of alkalinity. Then draw off the water from the black and treat the latter with an acid, as hereinbefore described.

A third method is to wash the limed black by alternately filling and emptying the cylinder with water. This method of washing assures a thorough washing of all of the black, no matter whether or not there are channels extending downward through the black, through which the water would in continuous washing mostly flow.

A fourth way is to fill the cylinder with water to above the level of the black and allow it to stand thus for a short period, or until the lime has become well absorbed into the pores of the black, after which the water is drawn off from the black either after washing a short time or immediately, and the black, still well charged with lime, is removed and thoroughly ignited in the ordinary revivifying-kilns or otherwise, after which it is washed first with water to remove from the black the free alkalies and any other soluble matters that there may be in the black, and then with an acid to remove the excess of carbonate of lime. As in the other modes of treatment hereinbefore set forth, the washing with the acid may be omitted and very fair results still be obtained. This method of treatment subjects the matters in the black to the action of the lime at a much higher temperature than is the case in any one of the other methods described, and in the instance of new black that, owing to defective burning in the process of its manufacture or to other causes, contains matters which during the reburning of the black would give rise to the formation of alkaline salts, this method would be quite effective, as it would meet not only the evil of the alkaline salts originally contained in the black, but also that of the salts of the same character that might be formed during the first reburning of the black. When the black is treated with an acid while in the cylinder B, by running the acid solution onto the surface of the black and allowing it to percolate downward through the mass of the same, I prefer to use a solution of sulphurous acid, ($SO_2$,) as its action is less energetic than that of a stronger acid, and so is more likely to reach the lower layers of black without having been entirely exhausted or neutralized during its passage through the black above, and so have some energy left to expend upon the said lower layers of the black; and, again, the upper strata of black are not so likely to be rotted by the action of the acid as if one of the strong acids were employed.

As I have hereinbefore intimated, the employment of an acid in washing the black is not essential in the case of either new or old black, as very good results are obtained by washing the limed black with water alone, but still by the use of the acid a somewhat better effect is obtained.

In the case of new black, my process may be embodied in the process of manufacturing the black—i. e., by mixing with the ground bones, before they are charred, a proportion of lime, by the presence of which the formation of the carbonates of the alkalies will be prevented, and then, after the charring of the bones has been completed, removing the excess of lime, the alkalies, and the excess of carbonate of lime by means of suitable solvents.

By my experiments in the treatment of bone-black I have ascertained that for the removal of the ammonia salts from black, either soda or potassa may be substituted for the lime in the treatment hereinbefore described, that old and nearly-spent black may be revivified to a great degree by treating the same with soda or potassa, either as hydrates or as carbonates, in a manner similar to that already described for treating black with lime, and that both new and old black may be benefited to a degree by washing the same with sulphurous acid ($SO_2$) without a previous treatment with lime, and then washing the excess of the acid and the sulphites formed from the black with water.

Thus having described my process for improving new and old bone-black, for the purpose of refining sugar-liquors, I claim as mine and desire to secure to myself by Letters Patent—

1. The within-described process of increasing the potency of new or of old and spent bone-black, as a decolorizer and purifier of sugar solutions, consisting in charging or impregnating the said new or spent black with lime, and in removing from the black by means of suitable solvents the excess of lime, if any, and the products of the action of the lime on the black, substantially as specified.

2. The within-described process of treating new or old bone-black to increase their powers as decolorizers and purifiers of sugar solutions, consisting in impregnating the said new or old bone-black with lime, and in removing the products of the action of the lime on the black from the black by washing it (the said limed black) first with water, then with an acid, and finally with water, substantially as specified.

3. The herein-described process of intimately mixing bone-black with a solution of an acid, consisting in running a stream of the black and a stream of the acid solution simultaneously into and through a suitable mixing apparatus, substantially as specified.

S. MORRIS LILLIE.

Witnesses:
A. BODINE,
SAML. S. BODINE.